(12) United States Patent
Park

(10) Patent No.: US 12,203,588 B2
(45) Date of Patent: Jan. 21, 2025

(54) DISPLAY APPARATUS

(71) Applicant: LG DISPLAY CO., LTD., Seoul (KR)

(72) Inventor: Soohyun Park, Gumi-si (KR)

(73) Assignee: LG DISPLAY CO., LTD., Seoul (KR)

( * ) Notice: Subject to any disclaimer, the term of this patent is extended or adjusted under 35 U.S.C. 154(b) by 362 days.

(21) Appl. No.: 17/865,984

(22) Filed: Jul. 15, 2022

(65) Prior Publication Data

US 2023/0019173 A1 Jan. 19, 2023

(30) Foreign Application Priority Data

Jul. 16, 2021 (KR) .......................... 10-2021-0093241

(51) Int. Cl.
| | | |
|---|---|---|
| F16M 11/04 | (2006.01) | |
| B60R 11/00 | (2006.01) | |
| B60R 11/02 | (2006.01) | |
| F16M 11/18 | (2006.01) | |

(52) U.S. Cl.
CPC ....... *F16M 11/046* (2013.01); *B60R 11/0235* (2013.01); *F16M 11/18* (2013.01); *B60R 2011/0005* (2013.01); *B60R 2011/0082* (2013.01); *B60R 2011/0092* (2013.01); *F16M 2200/066* (2013.01)

(58) Field of Classification Search
CPC .................. F16M 11/046; F16M 11/18; F16M 2200/066; B60R 11/0235; B60R 2011/0005; B60R 2011/0082; B60R 2011/0092; G06F 11/652; G09F 9/301; H05K 5/0017

USPC ................................... 248/240.1; 361/679.01
See application file for complete search history.

(56) References Cited

U.S. PATENT DOCUMENTS

| | | | |
|---|---|---|---|
| 10,506,726 B2 * | 12/2019 | Kang | H10K 77/111 |
| 10,678,051 B2 * | 6/2020 | Nakayama | G02B 27/0149 |
| 10,890,947 B2 | 1/2021 | Choi | |
| 11,699,366 B2 * | 7/2023 | Song | G06F 1/1652 |
| | | | 361/679.01 |
| 2003/0080653 A1 * | 5/2003 | Shepard | A47F 3/002 |
| | | | 312/117 |
| 2018/0160554 A1 * | 6/2018 | Kang | H05K 5/0017 |
| 2022/0076596 A1 * | 3/2022 | Song | G06F 1/1656 |
| 2023/0217611 A1 * | 7/2023 | Lee | G06F 1/1601 |
| | | | 361/807 |

FOREIGN PATENT DOCUMENTS

KR   10-2020-0079002 A   7/2020

* cited by examiner

*Primary Examiner* — Anita M King
(74) *Attorney, Agent, or Firm* — Birch, Stewart, Kolasch & Birch, LLP

(57) ABSTRACT

A display apparatus includes an at least partially deformable display, an at least partially deformable apron, the apron is coupled to the display and moves in a vertical direction to change an externally exposed area thereof, a housing for accommodating at least a portion of each of the display and the apron, a base coupled to the housing, a guide having a first end mounted on the apron and a second end mounted on the base, the guide moves the display and the apron in the vertical direction to change an externally exposed area of each of the display and the apron, and a moving supporter having a first end mounted on the apron to move in the vertical direction and a second end mounted on the base to move in a lateral direction with respect to the base.

20 Claims, 9 Drawing Sheets

DISPLAY APPARATUS

CROSS-REFERENCE TO RELATED APPLICATION

This application claims priority under 35 U.S.C. § 119 to Korean Patent Application No. 10-2021-0093241 filed on Jul. 16, 2021 in the Republic of Korea, the entire contents of which are herein incorporated by reference into the present application.

BACKGROUND OF THE DISCLOSURE

Technical Field

The present disclosure relates to a display apparatus, and more particularly, to a display apparatus having a structure to effectively cope with an external impact.

Description of the Related Art

Contents described in this Background section simply provide background information about the present disclosure and do not constitute the prior art.

As we enter a full-fledged information era, a display apparatus that visually expresses an electrical information signal has developed rapidly. In response thereto, various display apparatuses having excellent performance, thinness, light weight, and low power consumption have been developed.

The display apparatus include a liquid crystal display apparatus (LCD), a quantum dot (QD) display apparatus, a field emission display apparatus (FED), an electro-wetting display apparatus (EWD), and an organic light-emitting display apparatus (OLED), etc.

The display apparatus is miniaturized so that the apparatus can be carried by a user. The display apparatus has been developed to be mounted on a movable apparatus such as a vehicle. Thus, the user can use the display apparatus on the vehicle more conveniently.

SUMMARY OF THE DISCLOSURE

When a display apparatus is mounted on a movable apparatus (e.g., a vehicle, a bicycle, an airplane, etc.), an impact that can be received from the outside by a movement can be transmitted to the display apparatus.

Due to the external impact, the display apparatus can be deformed or, in severe cases, can be damaged due to the external impact. Even when the external impact is relatively weak, the display apparatus can be subject to vibration due to such external impact (e.g., movable apparatus).

When the display apparatus vibrates due to the external impact, a user can feel uncomfortable using the display apparatus. When such vibration occurs for a long time, a malfunction, a failure, a damage, and the like of the display apparatus due to the vibration can occur.

In particular, in a case of a display apparatus having a slim structure or a display apparatus having a display having a flexible structure that is bent, the effect of the external impact can be greater.

Therefore, in the case of the display apparatus mounted on the movable apparatus such as the vehicle, it is required to manufacture a display apparatus having a structure that can withstand the external impact (e.g., external force) stably.

Therefore, a purpose of the present disclosure is to provide a display apparatus having a structure that can effectively cope with the external impact (e.g., external force).

In addition, a purpose of the present disclosure is to provide a display apparatus having a structure that can stably support a display against an external impact (e.g., external force) in the display apparatus having the display having a flexible structure that can be bent.

In addition, a purpose of the present disclosure is to provide a display apparatus having a structure that can give a design aesthetic when viewing an appearance of the display apparatus.

Purposes of the present disclosure are not limited to the above-mentioned purpose. Other purposes and advantages of the present disclosure that are not mentioned can be understood based on following descriptions, and can be more clearly understood based on embodiments of the present disclosure. Further, it will be easily understood that the purposes and advantages of the present disclosure can be realized using means shown in the claims and combinations thereof.

A display apparatus according to an embodiment can include a display and an apron. The display and the apron can be coupled to each other, and the display can be made of a flexible material that can be deformed (e.g., elastically deformed and plastically deformed).

In order to accommodate at least a portion of each of the display and the apron, the display apparatus can have a housing. When the display and the apron descend, at least a portion of each of the display and the apron is bent and deformed into a curved shape when viewed from the side to be accommodated inside the housing.

The display apparatus according to an embodiment can include the display, the apron, the housing, a base, a guide, and a moving supporter.

The display can be at least partially deformable (e.g., elastically deformable or plastically deformable). The display can move integrally with the apron by being coupled to the apron.

The apron can be at least partially deformable, can be coupled with the display, and can move in a vertical direction (e.g., along a vertical axis) to change an externally exposed area thereof (e.g., the apron can move along a vertical axis).

The housing can accommodate the at least a portion of each of the display and the apron. The at least a portion of each of the display and the apron can be bent and accommodated inside the housing. Because the display and the apron are movable, extents to which the display and the apron are accommodated inside the housing can vary.

The base can be coupled to the housing. The base can be partly coupled to the housing to support movements of the guide and the moving supporter.

One end of the moving supporter can be mounted on the apron and move in the vertical direction (e.g., along a vertical axis), and the other end thereof can be mounted on the base and move in a lateral direction (e.g., along a horizontal axis) with respect to the base.

The moving supporter can support the apron as one end thereof (e.g., a first end of the moving supporter) moves in the vertical direction of the display apparatus and the other end thereof (e.g., a second end of the moving supporter) moves in a front and rear direction of the display apparatus (e.g., the front and rear direction being transverse to the vertical direction).

The base can include a first base portion and a second base portion. The first base portion can be coupled with the guide and can be coupled to a top face of the housing. The moving supporter can be movably coupled to the second base portion and the second base portion can be coupled to the housing to surround at least a portion of the housing.

The second base portion can include a second-first base portion and a second-second base portion. The second-first base portion and the second-second base portion can be manufactured integrally (e.g., the second-first base portion and the second-second base portion can be integral, such they form a single unitary member). The second-first base portion can cover at least a portion of the top face of the housing and the moving supporter can be movably coupled to the second-first base portion. The second-second base portion can cover at least a portion of a rear face of the housing and can be bent from the second-first base portion.

The guide can include a first bracket, a second bracket, a third bracket, a moving portion, and a reinforcing plate. The first bracket can be coupled to the apron and move together with the apron. The first bracket can have a bar shape (e.g., plate shape and/or bent plate shape and/or planar shape), can be disposed such that a longitudinal direction thereof is in parallel with a left and right direction of the apron, and can be coupled to an upper portion of a rear face (e.g., rear surface) of the apron.

The second bracket can be coupled to the second bracket. The second bracket can have a bar shape (e.g., plate shape and/or planar shape), can be disposed such that a longitudinal direction thereof is in parallel with the left and right direction of the apron, and can be coupled to a top face of the first base portion.

The second bracket can be coupled to the first base portion. The third bracket can be formed to protrude upwards from the second bracket. The third bracket can have a hollow defined therein in which the moving portion is mounted (e.g., the third bracket can be hollow, such that the third bracket includes a hollow portion, a groove or a hole, such as a through-hole).

The moving portion can have one end (e.g., a first end) coupled to the first bracket, and can be inserted into the third bracket to be movable in the vertical direction (e.g., vertical axis) with respect to the third bracket. The moving portion can be inserted into the hollow (e.g., hollow portion) of the third bracket and can ascend and descend with respect to the third bracket.

In order to lift and lower the moving portion, the display apparatus can have a first motor and a first casing on which the first motor is mounted.

The first motor can be coupled to the housing, and can control the movement in the vertical direction of the moving portion as a rotation shaft thereof is coupled with the moving portion. The first casing can be coupled to the housing, at least a part of the first housing can be exposed to the outside, and a first motor can be mounted on the first housing.

The moving supporter can include a link, a first bar, and a second bar. The link and the first bar can respectively include a pair or links and a pair of first bars. The pair of links and the pair of first bars can be disposed to be spaced apart from each other in the left and right direction of the apron.

The link can be coupled to the apron. The link can be coupled to the upper portion of the rear face of the apron to ascend and descend together with the apron. One end (e.g., a first end) of the first bar can be pivotably coupled to the link. For example, one end of the first bar can be hinged to the link (e.g., the first bar can be hingedly connected to the link via a hinge). The second bar can be disposed such that a longitudinal direction thereof intersects a longitudinal direction of the first bar. The other end (e.g., a second end) of the first bar can be coupled to the second bar and the second bar can be movable on the second-first base portion.

The second-first base portion can further include a first guide in which the second bar is movably mounted. The first guide can have a first slit (e.g., a groove, a narrow opening, etc.)) having a longitudinal direction in a moving direction of the second bar and into which an end of the second bar is inserted.

The second-first base portion can further include a second guide disposed at a position spaced apart from the first guide and in which the second bar is movably mounted. The second guide can have a second slit (e.g., a groove, a narrow opening, etc.) having a longitudinal direction in the moving direction of the second bar and into which the second bar is inserted.

The display apparatus can further include an operating assembly disposed on the second-first base portion and operating the second bar to move with respect to the second-first base portion. The operating assembly can include a second motor, a second casing, and a rack apparatus.

The second motor can be disposed on the second-first base portion, can be movable on the second-first base portion in the moving direction of the second bar while rotating, and a pinion gear can be mounted on a rotation shaft of the second motor. The second casing can be equipped with the second motor, and the second casing can be coupled to the second bar to be movable on the second-first base portion integrally with the second bar.

The rack apparatus can have a rack gear coupled to the second-first base portion, coupled to the pinion gear, and disposed such that a longitudinal direction thereof is parallel to the moving direction of the second bar. The rack apparatus can be fixedly coupled to the second-first base portion, and the second bar can be movable with respect to the rack apparatus.

The display apparatus can include a first sensor and a second sensor. The first sensor can be disposed at a position relatively close to the apron on the second-first base portion, and the first sensor can come into contact with the second bar when an upper end of the apron reaches a position at the highest vertical level to sense a position (e.g., the highest vertical position) of the second bar.

The second sensor can be disposed at a position relatively far from the apron compared to the first sensor on the second-first base portion, and the second sensor can come into contact with the second bar when the upper end of the apron reaches a position at the lowest vertical level to sense the position (e.g., a lowest vertical position) of the second bar. The first sensor and the second sensor can be disposed to be spaced apart from each other in the front and rear direction of the second-first base portion. In this regard, the second bar can move forwards and rearwards on second-first base portion between a rear face of the first sensor and a front face of the second sensor.

The display apparatus can further include a first stopper and a second stopper disposed on the second-first base portion. The first stopper and the second stopper can be able to ascend and descend with respect to the second-first base portion.

The first stopper can be disposed at a position relatively close to the apron on the second-first base portion (e.g., the first stopper can be closer to the apron than the second stopper), and the first stopper can come into contact with the second bar when the upper end of the apron reaches the position at the highest vertical level to restrict a movement of the second bar.

The second stopper can be disposed at a position relatively far from the apron compared to the first stopper on the second-first base portion, and the second bar can come into contact with the second bar when the upper end of the apron reaches the position at the lowest vertical level to restrict the movement of the second bar.

The display apparatus can further include a cover. The cover can be coupled to the first bar and can move together with the first bar. The cover can cover at least a portion of the top face of the display apparatus when an upper end of the apron reaches a position at the lowest vertical level.

One embodiment of the display apparatus can include an at least partially deformable display, an at least partially deformable apron, wherein the apron is coupled to the display and moves in a vertical direction (e.g., vertical axis) to change an externally exposed area thereof, a housing for accommodating at least a portion of each of the display and the apron, a base coupled to the housing, a guide having one end (e.g., a first end) mounted on the apron and the other end (e.g., a second end) mounted on the base, wherein the guide moves the display and the apron in the vertical direction to change an externally exposed area of each of the display and the apron, and a moving supporter having one end (e.g., a first end) mounted on the apron to move in the vertical direction and the other end (e.g., a second end) mounted on the base to move in a lateral direction (e.g., perpendicular to the vertical direction/vertical axis) with respect to the base.

In the display apparatus according to the present disclosure, as the externally exposed area of the apron increases or decreases, the moving supporter moves correspondingly, so that the apron and the display attached thereto are stably supported regardless of the increase or the decrease of the externally exposed area of the apron, thereby effectively alleviating the impact and the vibration occurring on the apron and the display apparatus resulted from the external impact.

Accordingly, the user can always view an image or a video with good image quality, and damage to the display apparatus can be effectively suppressed.

In addition, in the display apparatus according to the present disclosure, when the display apparatus mounted in the dashboard of a vehicle is not used, the second cell of the cover can cover an upper portion of at least a portion of the display apparatus so as not to be exposed to the outside. Therefore, when the display apparatus is mounted in the dashboard of the vehicle, it is possible to minimize the external exposure of the display apparatus, thereby enhancing design aesthetics of the display apparatus.

Effects of the present disclosure are not limited to the above-mentioned effects, and other effects as not mentioned will be clearly understood by those skilled in the art from following descriptions.

The purposes, solutions, and effects of the disclosure as described above does not specify essential features of claims. Thus, the scope of claims is not limited by the purposes, solutions, and effects of the disclosure as described above.

DETAILED DESCRIPTION OF THE EMBODIMENTS

Figure 1:
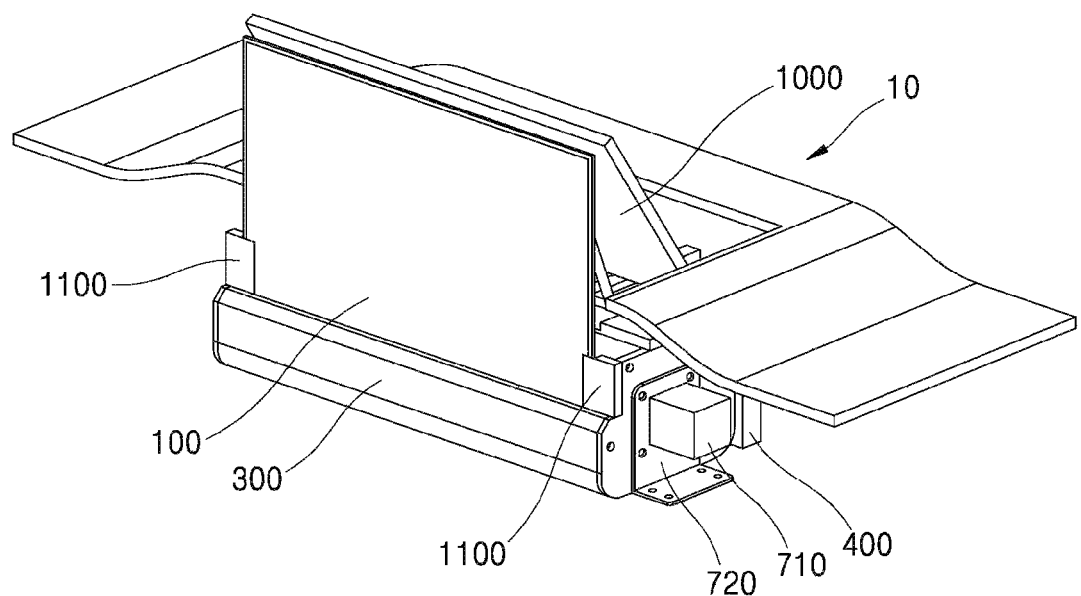
FIG. 1 is a perspective view showing a display apparatus according to an embodiment.

Advantages and features of the present disclosure, and how to achieve them will become apparent with reference to the embodiments described below in detail in conjunction with the accompanying drawings. However, the present disclosure is not limited to the embodiments as disclosed below, but will be implemented in a variety of different forms. Only these embodiments make the present disclosure complete, and are constructed to fully inform those having common knowledge in the technical field to which the present disclosure belongs of a scope of the disclosure. The scope of the present disclosure is only defined by the scope of the claims.

A shape, a size, a ratio, an angle, a number, etc. disclosed in the drawings for illustrating embodiments of the present disclosure are exemplary, and the present disclosure is not limited thereto. The same reference numerals refer to the same elements herein. Further, in describing the present disclosure, when it is determined that a detailed description of a related known element can unnecessarily obscure gist of the present disclosure, the detailed description thereof will be omitted. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof.

In interpreting a numerical value, the value is interpreted as including an error range unless there is no separate explicit description thereof.

It will be understood that when an element or layer is referred to as being "connected to", or "coupled to" another element or layer, it can be directly on, connected to, or coupled to the other element or layer, or one or more intervening elements or layers can be present. In addition, it will also be understood that when an element or layer is referred to as being "between" two elements or layers, it can be the only element or layer between the two elements or layers, or one or more intervening elements or layers can also be present. In addition, it will also be understood that when a first element or layer is referred to as being present "on" or "beneath" a second element or layer, the first element can be disposed directly on or beneath the second element or can be disposed indirectly on or beneath the second element with a third element or layer being disposed between the first and second elements or layers.

Further, as used herein, when a layer, film, region, plate, or the like is disposed "on" or "on a top" of another layer, film, region, plate, or the like, the former can directly contact the latter or still another layer, film, region, plate, or the like can be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former can directly contact the latter or still another layer, film, region, plate, or the like can be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

In descriptions of temporal relationships, for example, temporal precedent relationships between two events such as "after", "subsequent to", "before", etc., another event can occur therebetween unless "directly after", "directly subsequent" or "directly before" is not indicated.

It will be understood that, although the terms "first", "second", "third", and so on can be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The features of the various embodiments of the present disclosure can be partially or entirely combined with each other, and can be technically associated with each other or operate with each other. The embodiments can be implemented independently of each other and can be implemented together in an association relationship.

In descriptions of temporal relationships, for example, temporal precedent relationships between two events such as "after", "subsequent to", "before", etc., another event can occur therebetween unless "directly after", "directly subsequent" or "directly before" is not indicated. The features of the various embodiments of the present disclosure can be partially or entirely combined with each other, and can be technically associated with each other or operate with each other. The embodiments can be implemented independently of each other and can be implemented together in an association relationship. Spatially relative terms, such as "beneath," "below," "lower," "under," "above," "upper," and the like, can be used herein for ease of explanation to describe one element or feature's relationship to another element or feature as illustrated in the figures. It will be understood that the spatially relative terms are intended to encompass different orientations of the apparatus in use or in operation, in addition to the orientation depicted in the figures. For example, when the apparatus in the drawings can be turned over, elements described as "below" or "beneath" or "under" other elements or features would then be oriented "above" the other elements or features. Thus, the example terms "below" and "under" can encompass both an orientation of above and below. The apparatus can be otherwise oriented for example, rotated 90 degrees or at other orientations, and the spatially relative descriptors used herein should be interpreted accordingly.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, a first direction refers to a vertical direction of a display apparatus in a state in which the display apparatus is installed for daily use. A second direction means a direction orthogonal to the first direction, and the third direction means a direction perpendicular to both the first direction and the second direction. Further, as used herein, a phrase "move in the first direction" and a phrase "move up or down" can have the same meaning.

Figure 2:
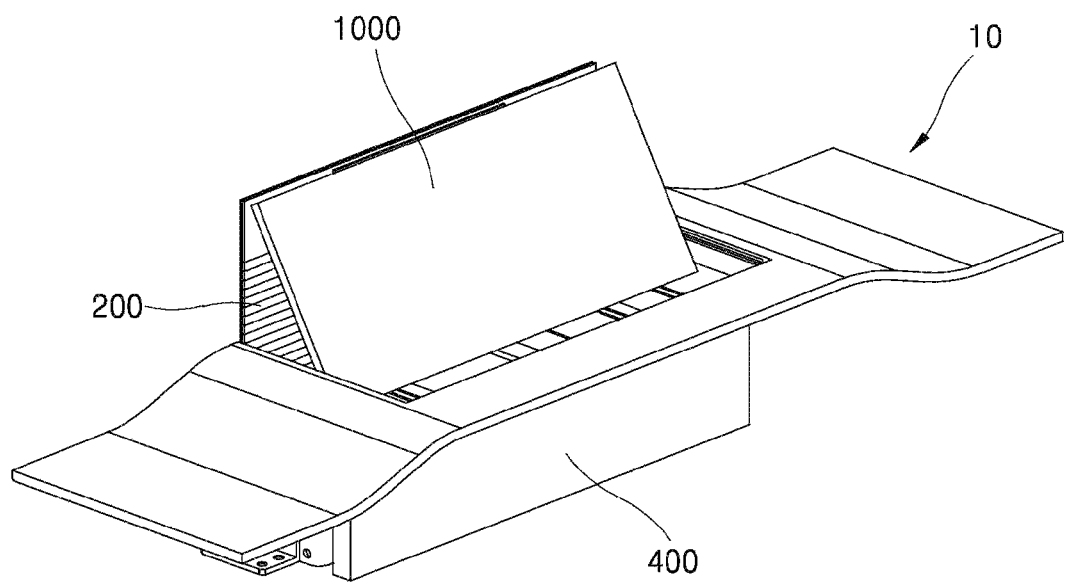
FIG. 2 is a perspective view of FIG. 1 in another direction.

FIG. 1 is a perspective view showing a display apparatus according to an embodiment. FIG. 2 is a perspective view of FIG. 1 in another direction.

The display apparatus according to an embodiment can be mounted on a mobile apparatus such as a vehicle to provide convenience to a user. Hereinafter, a display apparatus mounted on a dashboard 10 of the vehicle will be described by way of example.

The display apparatus according to an embodiment can include, for example, a liquid crystal display apparatus (LCD), a quantum dot (QD) display apparatus, a field emission display apparatus (FED), an electrowetting display apparatus (EWD), and an organic light-emitting display apparatus (OLED), etc. However, the present disclosure is not limited thereto.

Referring to FIG. 1, the display apparatus according to an embodiment can include a display 100 and an apron 200. The display 100 and the apron 200 are constructed to be coupled to each other. The display 100 can be made of a flexible material to be deformable.

The apron 200 can have a structure in which at least a portion thereof is deformable so that at least a portion thereof can move integrally with the display 100. Each of the display 100 and the apron 200 can be constructed such that at least a portion thereof slides in a vertical direction (e.g., vertical axis). For example, each of the display portion 100 and the apron 200 can be constructed such that at least a portion thereof ascends and descends.

The display apparatus can include a housing 300 to accommodate therein at least a portion of the display 100 and at least a portion of the apron 200. When the display 100 and the apron 200 move downward (e.g., a downward direction opposite to the vertical direction), at least a portion of each of the display 100 and the apron 200 can be bent and deformed to a curved shape when viewed from a side and thus can be accommodated in the housing 300.

When the display 100 and the apron 200 ascend, the portion of each of the display 100 and the apron 200 bent and accommodated inside the housing 300 is unfolded again and exposed to the outside of the housing 300. A user can view an image or a video reproduced on the unfolded portion of the display 100.

The display apparatus can be of a buried type in which at least a portion thereof is mounted in a recessed portion of the dashboard 10. In addition, the display apparatus can include a cover 1000.

When an upper end of the apron 200 is located at a lowest vertical level, the cover 1000 can cover at least a portion of a top face of the display apparatus, and can be disposed at a location vertically the same as or extremely close to a location of the portion of the dashboard 10 in which the display apparatus is disposed. The cover can cover an entirety of the top face of the display apparatus.

Because of the above-described role of the cover 1000, the structure in which the display apparatus mounted in the dashboard 10 is mounted can give a neat aesthetic feeling to the user as a whole. The cover 1000 will be described in detail with reference to the drawings below.

The display apparatus can further include a guide bracket 1100. The guide bracket 1100 can be mounted on the housing 300 and can come into contact with a portion of at least one of the display 100 and the apron 200 to guide the movement of the apron 200.

Referring to FIG. 1, the guide bracket 1100 can include a pair or guide brackets protruding from both sides of the housing 300, respectively. Each guide bracket 1100 can be in contact with an edge of a front face of the display 100 or can be in contact with each of both sides of the apron 200. The guide brackets 1100 can be spaced apart from one another and by a width of the display 100.

The display 100 or the apron 200 can be slid in the guide bracket 1100 to enter or come out of a slot (e.g., hole or groove) defined in the housing 300. Accordingly, the guide bracket 1100 can serve to guide the display 100 and the apron 200 to smoothly pass through the slot of the housing 300.

Figure 3:
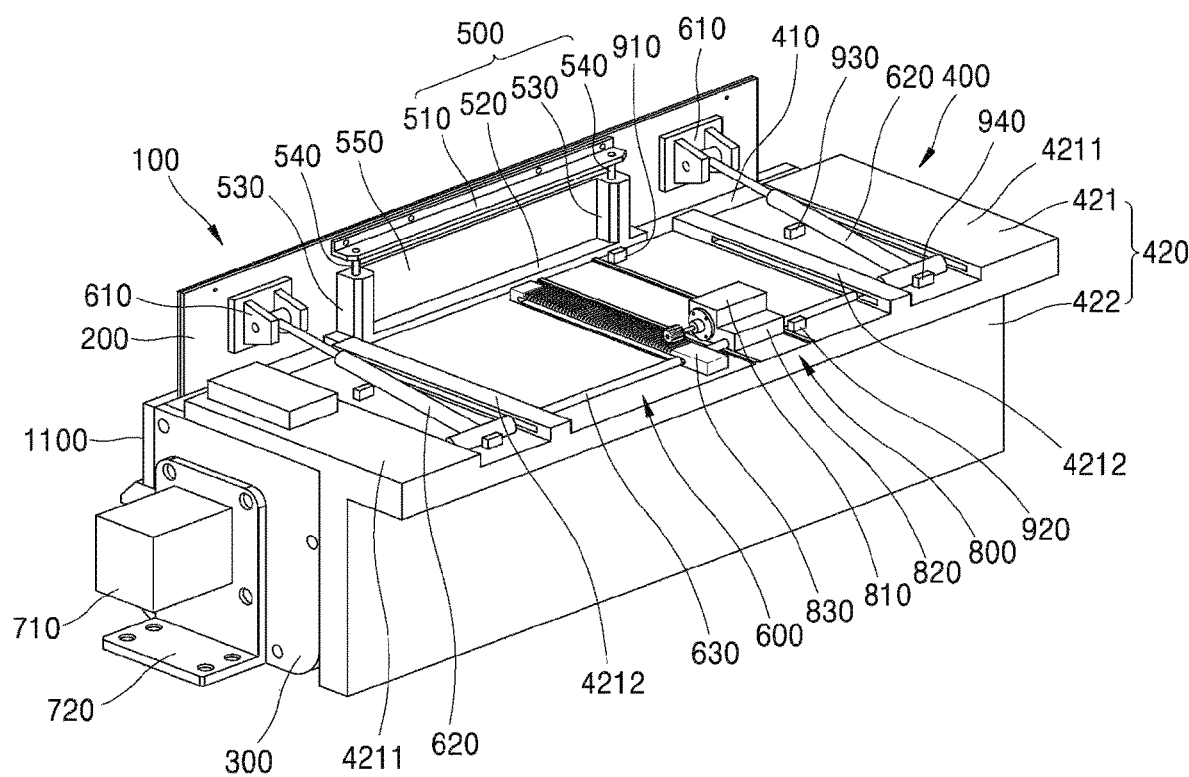
FIG. 3 is a view in which a dashboard and a cover are omitted from a display apparatus according to an embodiment.
Figure 4:
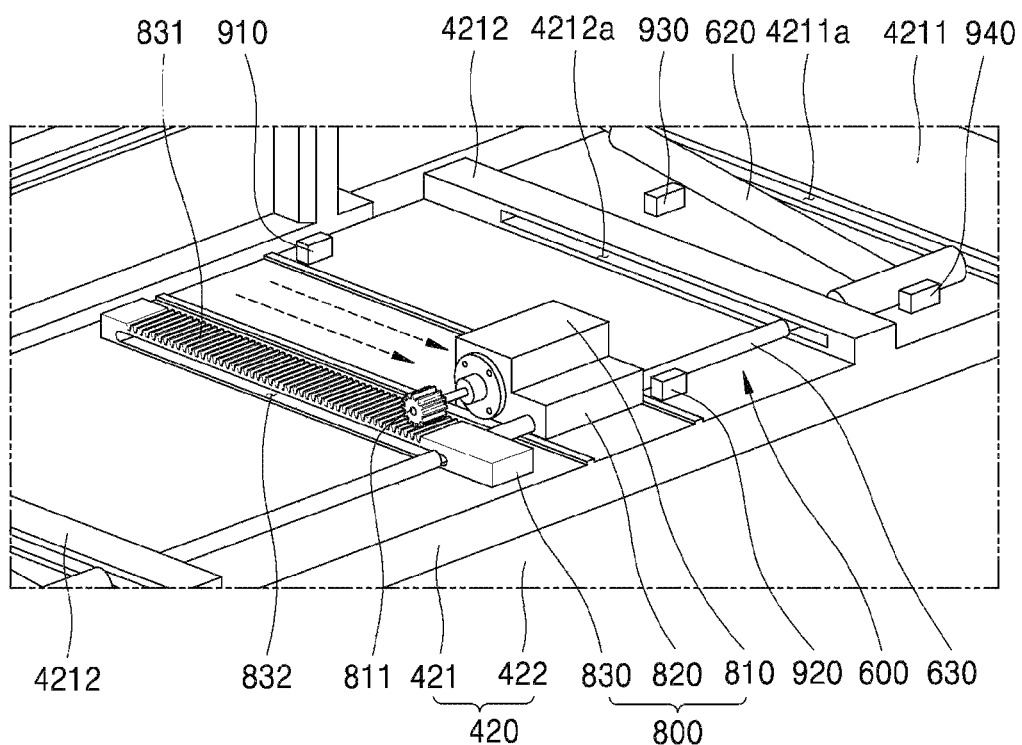
FIG. 4 is an enlarged view of a portion in FIG. 3.
Figure 5:
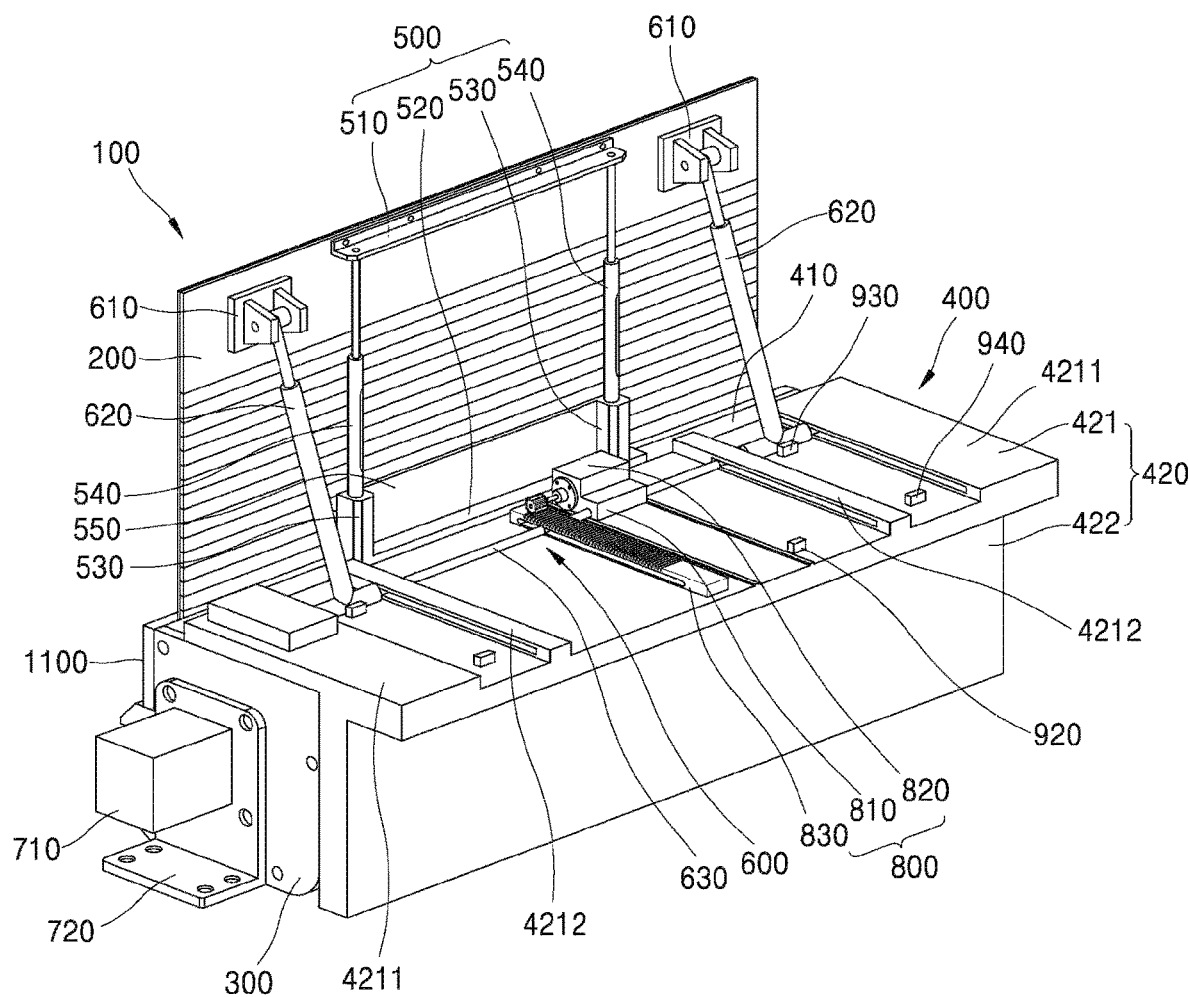
FIG. 5 is a view showing a state in which a display has ascended of FIG. 3.

Hereinafter, the display apparatus will be described with reference to the drawings. FIG. 3 is a view in which the dashboard 10 and the cover 1000 are omitted from the display apparatus according to an embodiment. FIG. 4 is an enlarged view of a portion in FIG. 3. FIG. 5 is a view showing a state in which the display 100 has ascended of FIG. 3.

The display apparatus according to an embodiment can include the display 100, the apron 200, the housing 300, a base 400, a guide 500, and a moving supporter 600.

The display 100 can be constructed such that at least a portion thereof is deformable (e.g., elastically deformable). The display 100 can display an image or a video, and a display method is the same as described above. The display 100 can be in a shape of approximately an entirely rectangular thin plate when fully unfolded. For example, the display 100 can be in the form of a rectangular plate and the display 100 can be relatively thin.

The display 100 can be coupled with the apron 200 to move integrally with the apron 200. When there is no specific mention below, it can be understood that, when the apron 200 moves, the display 100 also moves.

The apron 200 can be constructed such that at least a portion thereof is deformable (e.g., elastically deformable), can be coupled to the display 100, and can move in the vertical direction (e.g., vertical axis) to change an externally exposed area thereof. In this regard, the externally exposed area of the apron 200 means an area of a portion of the apron 200 exposed to the outside of the housing 300.

The apron 200 can be coupled to the display 100 to support the display 100. For example, because a front face of the apron 200 is adhered to a rear surface of the display 100 with an adhesive, fastener(s) or the like, the apron 200 and the display 100 can be coupled to each other, but the present disclosure may not be limited thereto.

The portion exposed to the outside of the apron 200 can be unfolded flat, and accordingly, a portion of the display 100, which corresponds to the exposed portion of the apron 200, coupled to the front face of the apron 200, can also be unfolded flat.

The housing 300 can accommodate the at least a portion of each of the display 100 and the apron 200. The housing 300 can be mounted in a recessed portion of the dashboard 10, so that at least a portion thereof can be accommodated in the dashboard 10.

As described above, the at least a portion of each of the display 100 and the apron 200 can be bent and accommodated in the housing 300. Because the display 100 and the apron 200 are movable, a range in which the display 100 and the apron 200 are accommodated inside the housing 300 can be variable.

For example, when the user uses the display apparatus, the upper end of the apron 200 ascends, so that the range in which the apron 200 and the display 100 are accommodated inside the housing 300 can be reduced. Conversely, when the user does not use the display apparatus, the upper end of the apron 200 descends, so that the range in which the apron 200 and the display 100 are accommodated inside the housing 300 can be increased.

The base 400 can be coupled to the housing 300. A portion of the base 400 can be coupled to the housing 300 to support movements of the guide 500 and the moving supporter 600 to be described later.

The guide 500 can have one end (e.g., a first end) mounted on the apron 200 and the other end (e.g., a second end) mounted on the base 400 and can move in the vertical direction (e.g., along the vertical axis). The guide 500 can move the display 100 and the apron 200 in the vertical direction to change externally exposed areas of the display 100 and the apron 200.

As sides of the apron 200 move in the vertical direction, the upper end of the apron 200 can move between the highest vertical level and the lowest vertical level. Accordingly, the externally exposed areas of the display 100 and the apron 200 can be changed.

One end (e.g., a first end) of the moving supporter 600 can be mounted on the apron 200 to move in the vertical direction, and the other end (e.g., a second end) thereof can be mounted on the base 400 to move in a lateral direction (e.g., transverse to the vertical direction) with respect to the base 400.

The moving supporter 600 can support the apron 200 while one end (e.g., a first end) thereof moves in the vertical direction of the display apparatus and the other end (e.g., a second end) thereof moves in a front and rear direction (e.g., transverse to the lateral direction and transverse to the vertical direction) of the display apparatus.

As the apron 200 moves in the vertical direction of the display apparatus, the moving supporter 600 can support the apron 200 while moving in the vertical direction and the front and rear direction of the display apparatus in response thereto.

The moving supporter 600 can be coupled to the externally exposed portion of the apron 200 to stably support the apron 200 at any position of a movement path of the apron 200 when the apron 200 moves in the vertical direction.

The display apparatus disposed in a movable apparatus, such as a vehicle, and can be subjected to an impact (e.g., external force) from the outside during movement of the movable apparatus. Such impact can directly damage the display apparatus or cause vibration in the display apparatus. This is the same as described above as the problem.

Therefore, the display apparatus disposed in the movable apparatus, such as the vehicle, requires a structure for supporting the display apparatus to withstand the external impact. In particular, it is necessary to have a structure that supports the externally exposed portions of the display 100 and the apron 200, which are directly used by the user, so as not to be damaged or vibrated due to the external impact.

In an embodiment, as the externally exposed area of the apron 200 increases or decreases, the moving supporter 600 moves correspondingly (e.g., in a corresponding manner to the apron 200), so that the apron 200 and the display 100 attached thereto are stably supported regardless of the increase or the decrease of the externally exposed area of the apron 200, thereby effectively alleviating the impact and the vibration occurring on the apron 200 and the display apparatus resulted from the external impact (e.g., external force). Accordingly, the user can always view an image or a video with good image quality, and damage to the display apparatus can be effectively suppressed (e.g., prevented).

The base 400 can be generally manufactured in a plate shape having a predetermined thickness, and can include a first base portion 410 and a second base portion 420. The first base portion 410 can be coupled to the guide 500 and coupled to a top face of the housing 300. The first base portion 410 can be coupled to the housing 300 to support the guide 500.

The guide 500 can be coupled to the first base portion 410 and can be disposed on the first base portion 410. Because the first base portion 410 is disposed at a front portion of the base 400, the guide 500 can also be disposed at a position adjacent to the front portion of the base 400 and the rear face (e.g., rear surface) of the apron 200.

The second base portion 420 can be coupled such that the moving supporter 600 is movable, and can be coupled to the housing 300 to surround at least a portion of the housing 300. Accordingly, the second base portion 420 can accommodate the at least a portion of the housing 300 therein to protect the housing 300 and support the movement of the moving supporter 600.

The second base portion 420 can include a second-first base portion 421 and a second-second base portion 422. The second-first base portion 421 and the second-second base portion 422 can be integrally manufactured (e.g., the second-first base portion and the second-second base portion can be integral, such they form a single unitary member). The second-first base portion 421 can cover at least a portion of a top face of the housing 300, and can be coupled such that the moving supporter 600 is movable.

The second-second base portion 422 can cover at least a portion of a rear face of the housing 300 and be bent from the second-first base portion 421. The second-second base portion 422 can surround at least a portion of the rear surface of the housing 300 and block external exposure of the housing 300 to protect the housing 300.

The guide 500 can include a first bracket 510, a second bracket 520, a third bracket 530, a moving portion 540, and a reinforcing plate 550. The first bracket 510 can be coupled to the apron 200 to move together with the apron 200. The first bracket 510 can have a bar shape (e.g., a plate shape), can be disposed such that a longitudinal direction of the first bracket 510 is parallel to a left and right direction (e.g., longitudinal direction) of the apron 200, and can be coupled to an upper portion of the rear surface of the apron 200.

The first bracket 510 can ascend and descend on the display apparatus. As the first bracket 510 ascends and descends, the apron 200 and the display 100 coupled thereto also ascend and descend, so that the externally exposed areas of the apron 200 and the display 100 can be changed.

The second bracket 520 can be coupled to the first base portion 410. The second bracket 520 can have a bar shape (e.g., plate shape), can be disposed such that a longitudinal direction thereof is parallel to the left and right direction (e.g., longitudinal direction) of the apron 200, and can be coupled to a top of the first base portion 410. The first base portion 410 can support the second bracket 520.

The third bracket 530 can be formed to protrude upward from the second bracket 520. The third bracket 530 can extend in the vertical direction (e.g., vertical axis) from the second bracket 520. The third bracket 530 can include a pair of third brackets, the third brackets 530 can be disposed to be spaced apart from each other at a predetermined distance in the left and right direction (e.g., longitudinal direction) of the apron 200. A hollow in which the moving portion 540 is mounted can be defined in the third bracket 530. For example, the third bracket 530 can include a hollow portion.

The reinforcing plate 550 can be disposed between the pair of third brackets 530 that are spaced apart from each other, and can be coupled to the pair of third brackets 530 to allow the pair of third brackets 530 to maintain the designed separation distance therebetween. The reinforcing plate 550 can be formed in a plate shape and can be manufactured integrally with the pair of third brackets 530. However, the reinforcing plate 550 is not an essential component of the display apparatus.

The second bracket 520, the third bracket 530, and the reinforcing plate 550 can be integrally manufactured, but the present disclosure may not be limited thereto.

The moving portion 540 can have one end coupled to the first bracket 510, and can be inserted into the third bracket 530 to be movable in the vertical direction with respect to the third bracket 530. The moving portion 540 can be inserted into the hollow of the third bracket 530 and can ascend and descend with respect to the third bracket 530.

Therefore, at the same time as the moving portion 540 ascends and descends, the first bracket 510, the apron 200 coupled thereto, and the display 100 coupled to the apron 200 ascend and descend. Accordingly, the externally exposed areas of the apron 200 and the display 100 can be changed.

In order to lift and lower the moving portion 540, the display apparatus can include a first motor 710 and a first casing 720 on which the first motor 710 is mounted.

The first motor 710 can be coupled to the housing 300, and a rotation shaft thereof can be coupled to the moving portion 540 to control the vertical movement of the moving portion 540. The first casing 720 can be coupled to the housing 300, at least a portion of the first casing 720 can be exposed to the outside, and the first motor 710 can be mounted on the first casing 720.

Referring to FIG. 3, the first casing 720 can be mounted on a side face of the housing 300, and the first motor 710 can be mounted on a protruding portion of the first casing 720 (e.g., a vertical portion of the first casing 720). The first casing 720 can be a frame member having an L-shape and can include a vertical portion and a horizontal portion extending from a lower end of the vertical portion. The rotation shaft of the first motor 710 can be built into the housing 300, and can be coupled with the moving portion 540 moving in the vertical direction with respect to the housing 300.

For the coupling of the first motor 710 and the moving portion 540, for example, a rolling guide on which the display 100 and the apron 200 are wound can be disposed in the housing 300, and the rolling guide can be rotated by the first motor 710.

In this regard, a portion of the apron 200 that is not wound on the rolling guide can be unfolded, and the unfolded portion can move in the vertical direction of the display apparatus. In this regard, the moving portion 540 coupled with the apron 200 can move in the vertical direction. For example, the first motor 710 and the moving portion 540 can be coupled to each other by the apron 200. However, the present disclosure is not limited thereto.

Accordingly, the moving portion 540 can ascend and descend by the rotation of the first motor 710. By changing a rotation direction of the first motor 710, the moving portion 540 can be lifted or lowered. The operation of the first motor 710 can be controlled by a controller equipped in the display apparatus.

The moving supporter 600 can include a link 610, a first bar 620 (e.g., telescoping bar/rod), and a second bar 630. The link 610 and the first bar 620 can respectively include a pair of links and a pair of first bars. The pair of links 610 and the pair of first bars 620 can be disposed to be spaced apart from each other in the left and right direction of the apron 200. The link 610 and the first bar 620 can be disposed at the same position in the left and right direction of the apron 200.

It is proper that the link 610 and the first bar 620 are disposed at positions spaced apart from the moving portions 540 in the left and right direction of the apron 200 so as not to interfere with the ascending of the pair of moving portions 540 (e.g., telescoping bar/rod).

The link 610 can be coupled to the apron 200. Referring to FIGS. 3 and 5, the link 610 can be coupled to the upper portion of the rear surface of the apron 200 to ascend and descend together with the apron 200.

One end (e.g., a first end) of the first bar 620 can be pivotably coupled to the link 610. For example, one end (e.g., the first end) of the first bar 620 can be hinged to the link 610. Therefore, no matter where the link 610 is located in the vertical direction by the ascending and descending of the apron 200, the first bar 620 can stably support the apron 200.

The second bar 630 can be disposed such that a longitudinal direction of the second bar 630 intersects the longitudinal direction of the first bar 620, the other end (e.g., second end) of the first bar 620 can be coupled to the second bar 630, and the second bar 630 can be movable on the second-first base portion 421. For example, the second bar 630 can have a longitudinal axis that intersects a longitudinal axis of the first bar 620. In this regard, the first bar 620 and the second bar 630 can move integrally. The second bar 630 can be disposed such that the longitudinal direction thereof is parallel to the left and right direction of the apron 200.

The first bar 620 can move on the second-first base portion 421 while pivoting at an angle within a predetermined range with respect to the second-first base portion 421 as the apron 200 ascends. Similarly, the second bar 630 can also move on the second-first base portion 421 while rotating with respect to the second-first base portion 421 as the first bar 620 pivots. In this regard, a rotation shaft of the second bar 630 can be parallel to the longitudinal direction of the second bar 630.

The second bar 630 can be mounted on a first guide 4211, a second guide 4212, a second casing 820, and a rack apparatus 830, and can be guided by those components (e.g., the first guide 4211, the second guide 4212, the second casing 820, and the rack apparatus 830) to stably move on the second-first base portion 421. The second bar 630 can move in the front and rear direction on the second-first base portion 421 while rotating with respect to the first guide portion 4211, the second guide portion 4212, the second casing 820, and the rack apparatus 830 to which the second bar 630 is mounted.

In this regard, in slits respectively defined in the first guide 4211, the second guide 4212, the second casing 820, and the rack apparatus 830 into which the second bar 630 is inserted, the second bar 630 can have a small diameter portion having a smaller diameter than other portions of the second bar to correspond to a width of the slits. For example, the second bar 630 can include the small diameter portion that is disposed in slits/slots of the first guide 4211, the second guide 4212, the second casing 820, and the rack apparatus 830.

The second-first base portion 421 can further include the first guide 4211 on which the second bar 630 is movably mounted. The first guide 4211 can include a pair or first guides respectively disposed on both edges of the second-first base portion 421. The first guide 4211 can be disposed such that a longitudinal direction of the first guide 4211 is parallel to a front and rear direction of the second-first base portion 421, which is a moving direction of the second bar 630, that is, the front and rear direction of the display apparatus.

The first guide 4211 can have a first slit 4211a having a longitudinal direction in the moving direction of the second bar 630 and into which an end of the second bar 630 is inserted. The first slit 4211a can have a shape of a long groove having one side that is opened and the other side that is closed. Ends of the second bars 630 can be respectively inserted into the respective first slits 4211a of the pair of first guides 4211 and can move in the front and rear direction of the second-first base portion 421 along the first slits 4211a.

The second-first base portion 421 can further include a second guide 4212 disposed at a position spaced apart from the first guide 4211 and mounted such that the second bar 630 is movable. The second guide 4212 can include a pair of second guides, and the pair of second guides can be spaced apart from each other in the left and right direction and also to be spaced apart from the first guides 4211 in the left and right direction. Like the first guide 4211, the second guide 4212 can be disposed such that a longitudinal direction of the second guide 4212 is parallel to the front and rear direction of the second-first base portion 421, which is the moving direction of the second bar 630.

The second guide 4212 can include a second slit 4212a having a longitudinal direction in the moving direction of the second bar 630 and into which the second bar 630 is inserted. The second slit 4212a can be defined in a shape of a long hole extending through the second guide 4212. The second bar 630 can be inserted into the second slit 4212a to move in the front and rear direction of the second-first base portion 421 along the second slit 4212a.

The display apparatus can further include an operating assembly 800 disposed on the second-first base portion 421, the operating assembly 800 operates the second bar 630 to move with respect to the second-first base portion 421. The operating assembly 800 can include the second motor 810, the second casing 820, and the rack apparatus 830.

The second motor 810 can be disposed on the second-first base portion 421, can be movable on the second-first base portion 421 in the moving direction of the second bar 630 while rotating, and can have a pinion gear 811 mounted on a rotation shaft thereof.

As the second casing 820 is equipped with the second motor 810 and is coupled to the second bar 630, the second casing 820 can be movable on the second-first base portion 421 integrally with the second bar 630. A portion of the second casing 820 can accommodate a portion of the second motor 810 therein, and a hole into which the second bar 630 is inserted can be defined in another portion of the second casing 820.

Accordingly, as the second casing 820 moves in the front and rear direction on the second-first base portion 421, the second bar 630 can also move in the front and rear direction. As the second bar 630 moves in the front and rear direction, one end (e.g., a first end) of the first bar 620 coupled to the second bar 630 can also move in the front and rear direction. In this regard, the other end (e.g., a second) of the first bar 620 coupled to the link 610 can move in the vertical direction (e.g., along the vertical axis).

The rack apparatus 830 can have a rack gear 831 coupled to the second-first base portion 421, coupled to the pinion gear 811, and disposed such that a longitudinal direction of the rack gear 831 is parallel to the moving direction of the second bar 630.

The rack apparatus 830 can be fixedly coupled to the second-first base portion 421, and the second bar 630 can be movable with respect to the rack apparatus 830. The rack apparatus 830 can have the rack gear 831 formed on a top face thereof, and can have a third slit 832 defined therein in which the second bar 630 is movable.

The third slit 832 can be defined in a shape of a long hole extending through the rack apparatus 830. The second bar 630 can be inserted into the third slit 832 to move in the front and rear direction of the second-first base portion 421 along the third slit 832. The third slit 832 can guide the movement of the second bar 630 in front and rear direction.

Figure 6:
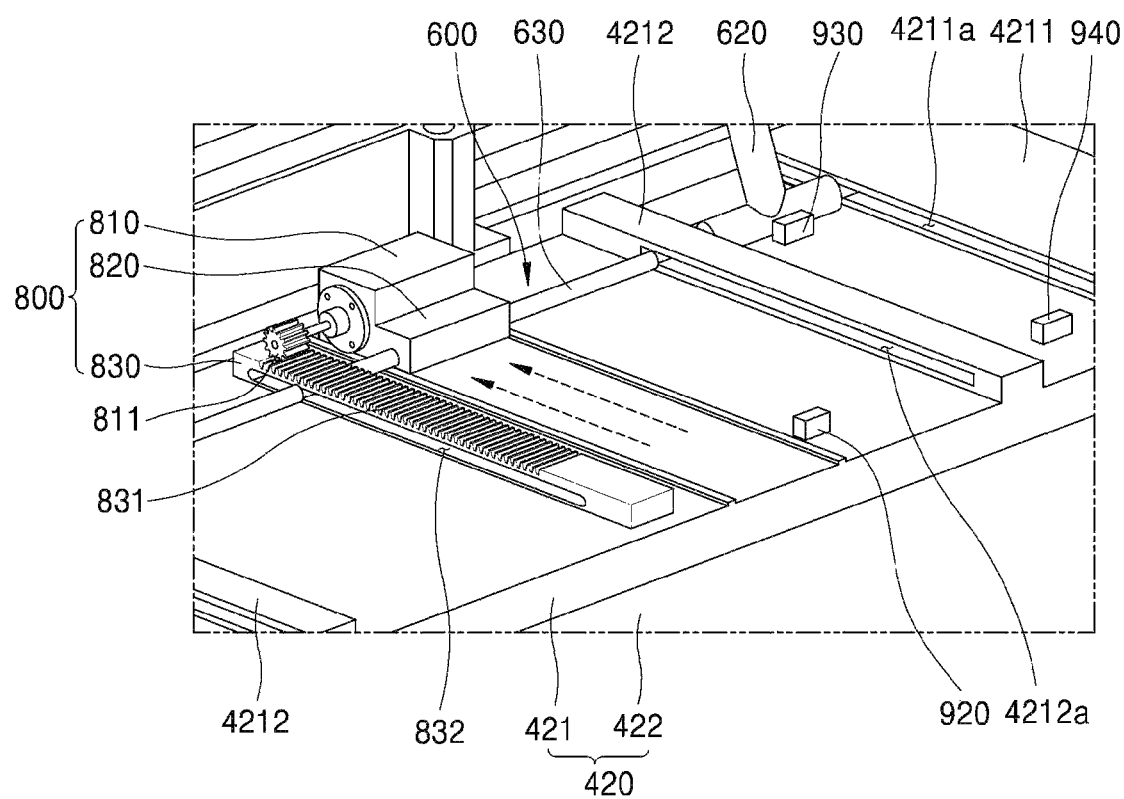
FIG. 6 is an enlarged view of a portion in FIG. 3.
Figure 7:
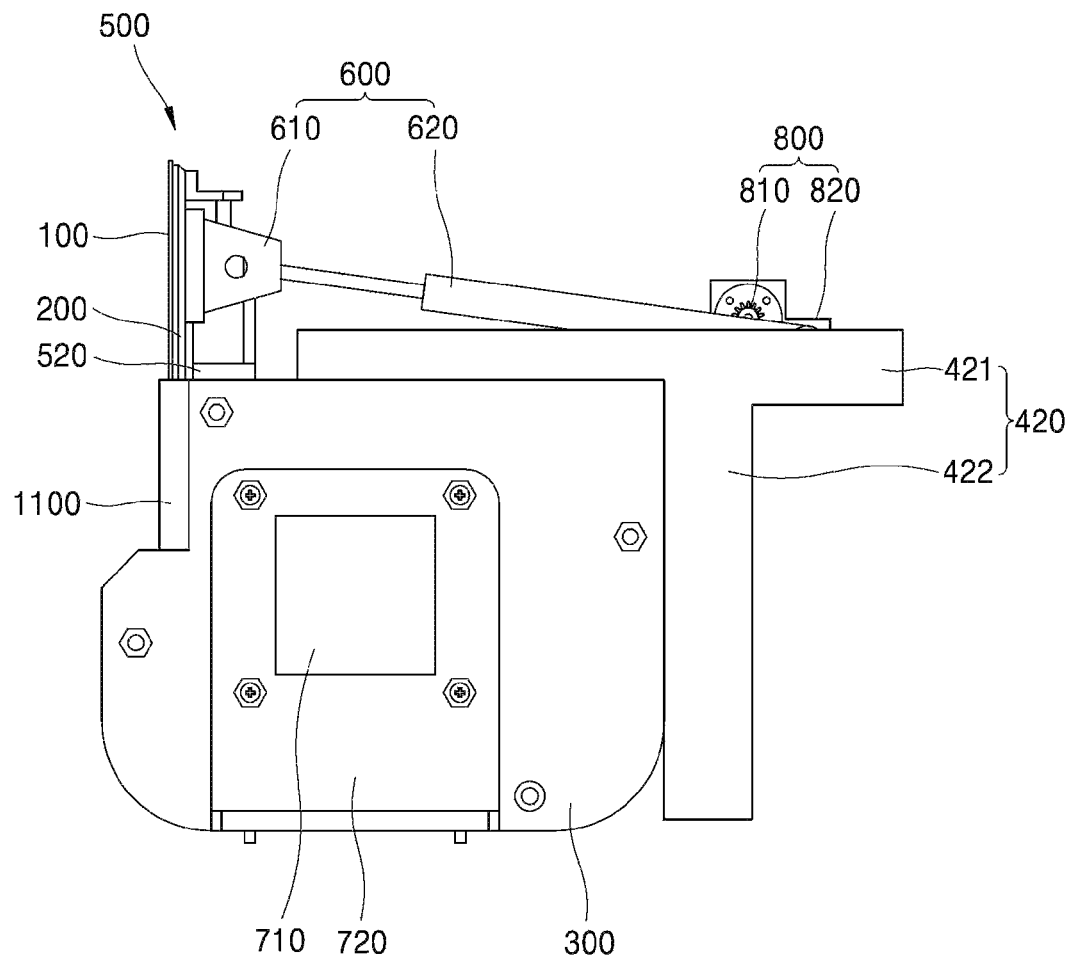
FIG. 7 is a side view of a display apparatus shown in FIG. 3.
Figure 8:
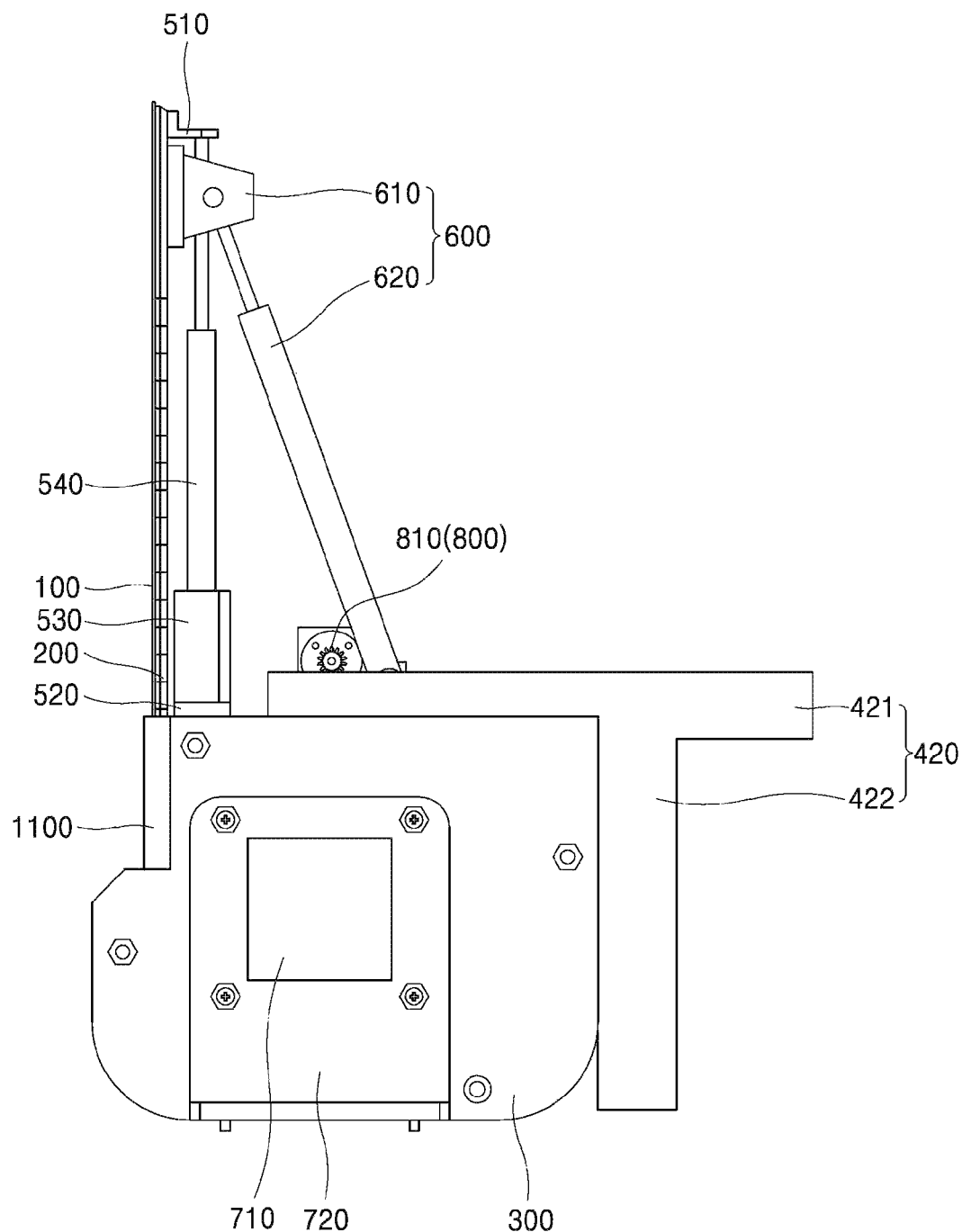
FIG. 8 is a side view of a display apparatus shown in FIG. 5.

FIG. 6 is an enlarged view of a portion in FIG. 3. In FIGS. 4 and 6, arrows indicate the moving direction of the second casing 820. FIG. 7 is a side view of a display apparatus shown in FIG. 3. FIG. 8 is a side view of a display apparatus shown in FIG. 5.

Referring to FIGS. 4 and 6, when the second motor 810 operates, the pinion gear 811 mounted on the rotation shaft moves in the front and rear direction along the rack gear 831 fixed on the second-first base portion 421 while rotating. Accordingly, the second motor 810 on which the pinion gear 811 is mounted and the second casing 820 can move in the front and rear direction.

When the apron 200 descends, as shown in FIG. 4, the casing can move rearwards. Conversely, when the apron 200 ascends, as shown in FIG. 6, the casing can move forwards. As the casing moves in the front and rear direction, the second bar 630 can also move in the front and rear direction to control the operation of the first bar 620.

The operation of the second motor 810 can be controlled by the controller equipped in the display apparatus. The first motor 710 for lifting and lowering the apron 200 and the second motor 810 for moving the second bar 630 forwards and rearwards can operate to be associated with each other at the same time.

For example, when the first motor 710 operates to lift the apron 200, the second motor 810 can operate simultaneously with operation of the first motor 710 to move the second bar 630 forwards. Conversely, when the first motor 710 operates to lower the apron 200, the second motor 810 can simultaneously operate with the first motor 710 to move the second bar 630 rearwards. Such association of the first motor 710 and the second motor 810 can be controlled by the controller (e.g., a hardware-embedded processor).

Even while the second motor 810 and the second casing 820 move on the second-first base portion 421, the first bar 620 and the second bar 630 can be connected to each other, and the second bar 630 can be supported by the second motor 810 by the coupling between the pinion gear 811 and the rack apparatus 830. Because of such structure, the exposed portion of the apron 200 can be always supported by the first bar 620 in the front and rear direction.

As described above, the moving supporter 600 can stably support the apron 200 and the display 100 no matter where an upper end of the apron 200 is located during the ascending and descending of the apron 200, thereby preparing for the case in which the impact is applied to the apron 200 and the display 100.

However, when the user does not use the display 100, the upper end of the apron 200 can be at the lowest vertical level, and when the user uses the display 100, the upper end of the apron 200 can be at the highest vertical level. Therefore, because the upper end of the apron 200 is located at the lowest and highest vertical levels for most of the time, in this case, it is necessary for the display apparatus to support the apron 200 more stably and the display 100 to prepare for the external impact (e.g., external force). To this end, the display apparatus of an embodiment can have a sensor and a stopper. This will be described.

Referring to FIGS. 4 and 6, the display apparatus according to an embodiment can include a first sensor 910 and a second sensor 920.

The first sensor 910 can be disposed at a position relatively close to the apron 200 on the second-first base portion 421, and can come into contact with the second bar 630 to sense the position (e.g., a highest vertical position) of the second bar 630 when the upper end of the apron 200 reaches the position of the highest vertical level.

The first sensor 910 can protrude on the second-first base portion 421 to sense the second bar 630 when being in contact with the second bar 630, and can transmit a signal therefor to the controller.

In order to use the display 100, the display 100 and the apron 200 can ascend by a manipulation of the user. When the apron 200 ascends, the second bar 630 can move toward a front portion of the second-first base portion 421 accordingly.

When the apron 200 ascends and the upper end thereof reaches the set highest vertical level, the first sensor 910 disposed at a front portion of the second-first base 421, that is, at a position close to the apron 200 can contact the second bar 630 that has moved forwards. The first sensor 910 can transmit a signal to the controller when in contact with the second bar 630, and the controller can stop the operation of the first motor 710 and the second motor 810 accordingly.

The second sensor 920 can be disposed on the second-first base portion 421 at a position relatively far from the apron 200 compared to the first sensor 910, and can come into contact with the second bar 630 when the upper end of the apron 200 reaches the position (e.g., the lowest vertical position) at the lowest vertical level to sense the position of the second bar 630.

The first sensor 910 and the second sensor 920 can be disposed to be spaced apart from each other in the front and rear direction of the second-first base portion 421. In this regard, the second bar 630 can move forward and backward on the second-first base portion 421 between a rear face of the first sensor 910 and a front face of the second sensor 920.

Like the first sensor 910, the second sensor 920 can protrude on the second-first base portion 421 to sense the second bar 630 when in contact with the second bar 630 and transmit a signal therefor to the controller.

When the display 100 is not used, the display 100 and the apron 200 can descend by the manipulation of the user (for example by user activation of the controller). When the apron 200 descends, the second bar 630 can move rearwards on the second-first base portion 421 accordingly.

When the apron 200 descends and the upper end thereof reaches the set lowest vertical level, the second sensor 920 disposed at a rear portion of the second-first base 421, that is, at the position relatively far from the apron 200 compared to the first sensor 910 can come into contact with the second bar 630 that has moved rearwards. The second sensor 920 can transmit the signal to the controller when in contact with the second bar 630, and the controller can stop the operation of the first motor 710 and the second motor 810 accordingly.

The display apparatus according to an embodiment can further include a first stopper 930 and a second stopper 940 disposed on the second-first base portion 421. The first stopper 930 and the second stopper 940 can be able to ascend and descend with respect to the second-first base portion 421. For example, the first stopper 930 and the second stopper 940 can be of a so-called Peekaboo type (e.g., the first stopper 930 and the second stopper 940 can descend in the second-first base portion 421 so as to be hidden from view, and can ascend from the second-first base portion 421 so as to be visible).

The display apparatus can have a driver for lifting and lowering the first stopper 930 and the second stopper 940, and the controller can control the driver to lift and lower the first stopper 930 and the second stopper 940.

Operations of the first stopper 930 and the second stopper 940 can be associated with each other so as to simultaneously ascend and descend. In another embodiment, the first stopper 930 and the second stopper 940 can operate independently of each other to ascend and descend at different times. Hereinafter, in the present specification, a structure in which the first stopper 930 and the second stopper 940 are associated with each other to ascend and descend at the same time will be described.

The first stopper 930 can be disposed at a position relatively close to the apron 200 on the second-first base portion 421, and can come into contact with the second bar 630 when the upper end of the apron 200 reaches the position (e.g., the highest vertical position) at the maximum vertical level to restrict the movement of the second bar 630.

The first stopper 930 can contact and support the second bar 630 such that the second bar 630 is not pushed rearwards on the second-first base portion 421. For example, when the display 100 and the apron 200 are subjected to the external impact at the highest vertical level, the first stopper 930 can support the second bar 630 to prevent a portion of each of the display 100 and the apron 200 from being bent rearwards of the display apparatus.

The second stopper 940 can be disposed at a position relatively far from the apron 200 compared to the first stopper 930 on the second-first base portion 421, and can come into contact with the second bar 630 when the upper end of the apron 200 reaches the position (e.g., lowest vertical position) at the lowest vertical level to restrict the movement of the second bar 630.

The second stopper 940 can contact and support the second bar 630 such that the second bar 630 is not pushed rearwards on the second-first base portion 421. For example, when the display 100 and the apron 200 are subjected to the external impact (e.g., external force) at the lowest vertical level, the second stopper 940 can support the second bar 630 to prevent a portion of each of the display 100 and the apron 200 from being bent rearwards of the display apparatus.

As described above, the operations of the first motor 710 and the second motor 810 and the ascending and descending of the first stopper 930 and the second stopper 940 can be controlled by the controller. First, the second bar 630 being supported by the first stopper 930 will be described in detail with reference to FIG. 6.

Before the first motor 710 and the second motor 810 operate, the display apparatus can be in the state in FIG. 4. In order for the apron 200 to ascend, the first stopper 930 and the second stopper 940 descend immediately before the first motor 710 and the second motor 810 operate. Because the first stopper 930 and the second stopper 940 descend so as not to be exposed on the second-first base portion 421, the second bar 630 can move in the front and rear direction on the second-first base portion 421 without being disturbed by the first stopper 930 and the second stopper 940. When the first motor 710 and the second motor 810 operate, the second bar 630 moves in a direction of the arrow in FIG. 6.

When the upper end of the apron 200 reaches the highest vertical level, the second bar 630 can come into contact with the first sensor 910. When the second bar 630 comes into contact with the first sensor 910, the controller that has received the contact signal from the first sensor 910 stops the operation of the first motor 710 and the second motor 810.

The controller lifts the first stopper 930 and the second stopper 940. The lifted first stopper 930 can come into contact with the second bar 630 to support the second bar 630 so as not to move rearwards of the display apparatus.

Hereinafter, with reference to FIG. 4, the second bar 630 being supported by the second stopper 940 will be described in detail. Before the first motor 710 and the second motor 810 operate, the display apparatus can be in the state in FIG. 6.

In order for the apron 200 to descend, the first stopper 930 and the second stopper 940 descend immediately before the first motor 710 and the second motor 810 operate. Because of the descending of the first stopper 930 and the second stopper 940, the second bar 630 can move in the front and rear direction on the second-first base portion 421 without being disturbed by the first stopper 930 and the second stopper 940. When the first motor 710 and the second motor 810 operate, the second bar 630 moves in a direction of the arrow in FIG. 4.

When the upper end of the apron 200 reaches the lowest vertical level, the second bar 630 can come into contact with the second sensor 920. When the second bar 630 comes into contact with the second sensor 920, the controller that has received the contact signal from the second sensor 920 stops the operation of the first motor 710 and the second motor 810.

The controller lifts the first stopper 930 and the second stopper 940. The lifted second stopper 940 can come into contact with the second bar 630 to support the second bar 630 so as not to move rearwards of the display apparatus.

Figure 9:
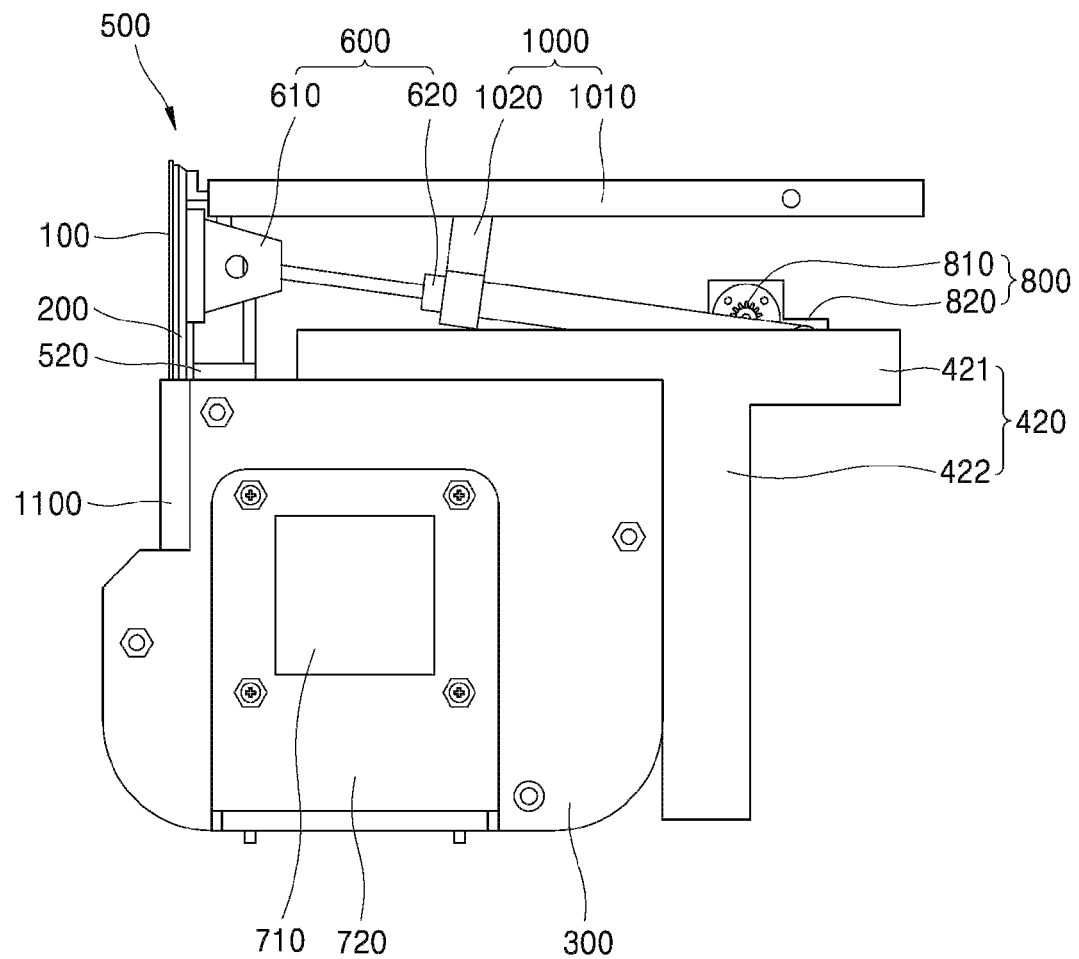
FIG. 9 is a view in which a cover is added to a display apparatus shown in FIG. 7.
Figure 10:
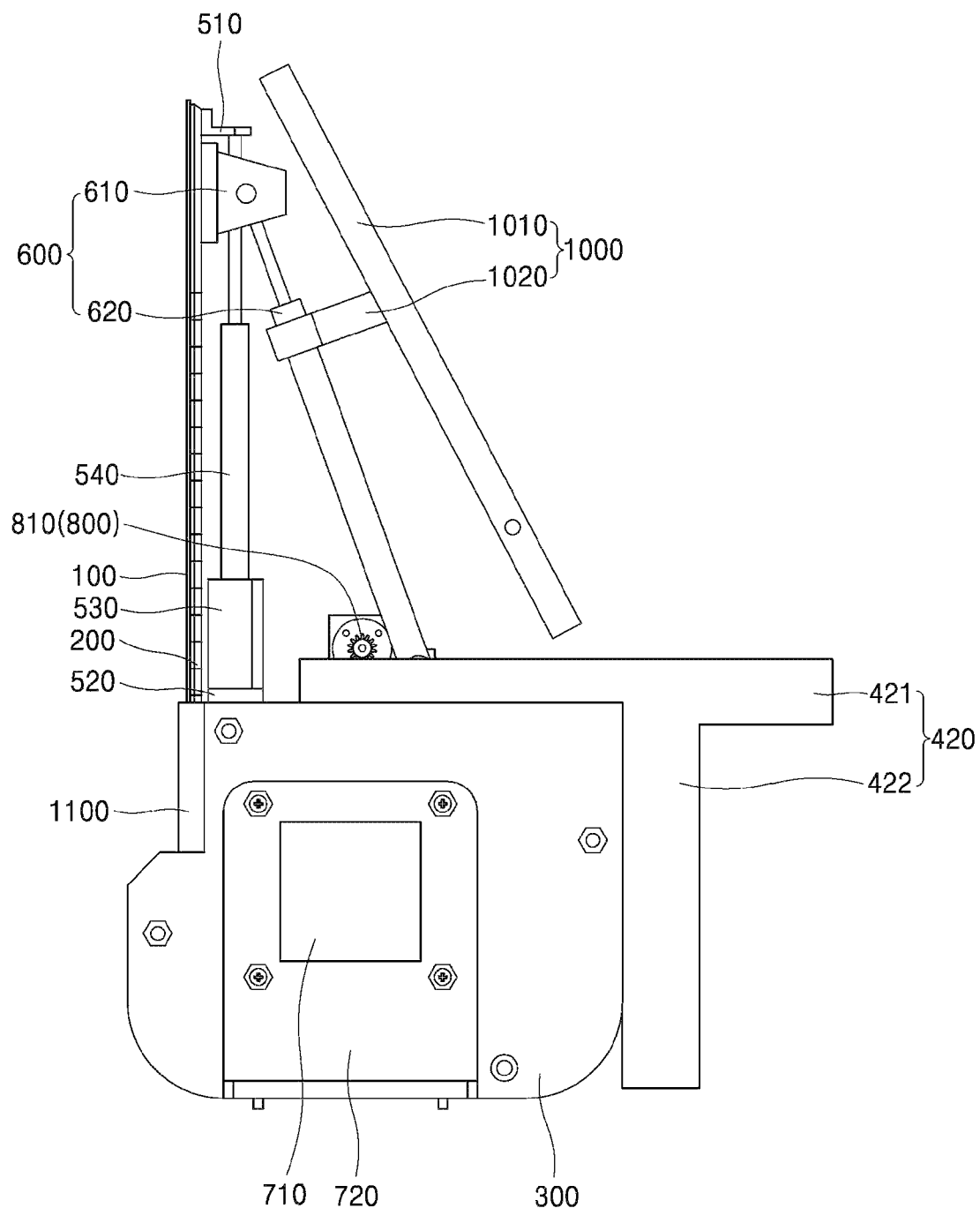
FIG. 10 is a view in which a cover is added to a display apparatus shown in FIG. 8.

FIG. 9 is a view in which the cover 1000 is added to the display apparatus shown in FIG. 7. FIG. 10 is a view in which the cover 1000 is added to the display apparatus shown in FIG. 8. The display apparatus according to an embodiment can further include the cover 1000.

The cover 1000 can be coupled to the first bar 620 and move together with the first bar 620, and can cover at least a portion of the top face of the display apparatus when the upper end of the apron 200 reaches the position at the lowest vertical level. The cover 1000 can include a first cell 1010 and a second cell 1020.

The first cell 1010 can be formed in a shape in which a through-hole is defined therein so as to be mounted on the first bar 620. Because the first bar 620 includes a pair of first bars, the first cell 1010 can also include a pair or first cells to correspond thereto.

The second cell 1020 can be coupled to the first cell 1010 to move and pivot with respect to the display apparatus based on a movement of the first bar 620. The second cell 1020 can be formed in a plate shape as a whole so as to cover the display apparatus.

As described above, when the display apparatus is not used, the upper end of the apron 200 can be placed at the set lowest vertical level. As shown in FIG. 9, when the upper end of the apron 200 is at the lowest vertical level, the second cell 1020 can be placed at a position at which the second cell 1020 is approximately horizontal to the display apparatus.

In addition, when the upper end of the apron 200 is at the lowest vertical level, the second cell 1020 can be disposed such that a vertical level of a top face of the second cell 1020 corresponds to a vertical level of a top face of the dashboard 10. In this regard, the second cell 1020 can neatly cover a top face of the recessed portion of the dashboard 10 defined for mounting the display in the dashboard 10.

In an embodiment, when the display apparatus mounted in the dashboard 10 of the vehicle is not used, the second cell 1020 of the cover 1000 can cover an upper portion of at least a portion of the display apparatus so as not to be exposed to the outside. Therefore, when the display apparatus is mounted in the dashboard 10 of the vehicle, it is possible to minimize the external exposure of the display apparatus, thereby enhancing design aesthetics of the display apparatus.

Features, structures, effects, and the like described in the examples of the present application described above are included in at least one example of the present application, and are not necessarily limited to only one example. Furthermore, features, structures, effects, and the like illustrated in at least one example of the present application can be combined or modified with respect to other examples by those of ordinary skill in the art to which the present application belongs. Accordingly, the contents related to such combinations and modifications should be interpreted as being included in the scope of the present application.

Various embodiments described herein may be implemented in a computer-readable medium using, for example, software, hardware, or some combination thereof. For example, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some cases, such embodiments are implemented by the controller. For example, the controller is a hardware-embedded processor executing the appropriate algorithms (e.g., flowcharts) for performing the described functions and thus has sufficient structure. Also, the embodiments such as procedures and functions may be implemented together with separate software modules each of which performs at least one of functions and operations. The software codes can be implemented with a software application written in any suitable programming language. Also, the software codes can be stored in the memory and executed by the controller, thus making the controller a type of special purpose controller specifically configured to carry out the described functions and algorithms. Thus, the components shown in the drawings have sufficient structure to implement the appropriate algorithms for performing the described functions.

The present disclosure as described above is not limited to the above-described embodiments and the accompanying drawings. It will be apparent to those of ordinary skill in the technical field to which the present disclosure belongs that various substitutions, modifications and changes can be made within the scope not departing from the technical ideas of the present disclosure. Therefore, the scope of the present disclosure is indicated by the following claims, and all changes or modifications derived from the meaning and scope of the claims and their equivalent concepts should be construed as being included in the scope of the present disclosure.

What is claimed is:

1. A display apparatus comprising:
   a display;
   an apron, wherein the apron is coupled to the display and moves in a vertical direction;
   a housing for accommodating at least a portion of each of the display and the apron;
   a base coupled to the housing;
   a guide having a first end mounted on the apron and a second end mounted on the base, wherein the guide moves the display and the apron in the vertical direction to change an externally exposed area of each of the display and the apron; and
   a moving supporter having a first end mounted on the apron to move in the vertical direction and a second end mounted on the base to move in a lateral direction with respect to the base.

2. The display apparatus of claim 1, wherein the base includes:
   a first base portion coupled with the guide and coupled to a top face of the housing; and
   a second base portion coupled with the moving supporter such that the moving supporter is movable and coupled to the housing, and
   wherein the second base portion surrounds at least a portion of the housing.

3. The display apparatus of claim 2, wherein the second base portion includes:
   a second-first base portion for covering at least a portion of the top face of the housing, wherein the moving supporter is movably coupled to the second-first base portion; and
   a second-second base portion for covering at least a portion of a rear face of the housing, wherein the second-second base portion extends from the second-first base portion.

4. The display apparatus of claim 2, wherein the guide includes:
   a first bracket coupled to the apron and for moving together with the apron;
   a second bracket coupled to the first base portion;
   a third bracket protruding upwards from the second bracket; and
   a moving portion having a first end coupled to the first bracket and disposed in the third bracket to be movable in the vertical direction with respect to the third bracket.

5. The display apparatus of claim 4, further comprising:
   a first motor coupled to the housing and having a rotation shaft coupled to the moving portion to control the movement of the moving portion in the vertical direction; and
   a first casing coupled to the housing and including the first motor, wherein at least a portion of the first casing is exposed to outside.

6. The display apparatus of claim 3, wherein the moving supporter includes:
a link coupled to the apron;
a first bar having a first end pivotably coupled to the link; and
a second bar disposed having a longitudinal axis intersecting a longitudinal axis of the first bar, and
wherein a second end of the first bar is coupled to the second bar, and the second bar is movable on the second-first base portion.

7. The display apparatus of claim 6, wherein the second-first base portion further includes a first guide, and wherein the first guide includes a first slit having a longitudinal axis in a moving direction of the second bar, wherein an end of the second bar is movably mounted to the first slit.

8. The display apparatus of claim 7, wherein the second-first base portion further includes a second guide disposed at a position spaced apart from the first guide,
wherein the second guide includes a second slit having a longitudinal axis in the moving direction of the second bar, wherein the second bar is movable mounted to the second slit.

9. The display apparatus of claim 6, further comprising an operating assembly disposed on the second-first base portion and configured to cause the second bar to move with respect to the second-first base portion.

10. The display apparatus of claim 9, wherein the operating assembly includes:
a second motor disposed on the second-first base portion and including a pinion gear;
a second casing, the second motor mounted on the second casing, wherein the second casing is coupled to the second bar to be movable on the second-first base portion integrally with the second bar; and
a rack apparatus having a rack gear coupled to the second-first base portion, coupled to the pinion gear, and disposed such that a longitudinal direction of the rack apparatus is parallel to the moving direction of the second bar.

11. The display apparatus of claim 10, wherein the second motor is configured to rotate the pinion gear to move the pinion gear with respect to the rack gear to cause the second bar to move with respect to the second-first base portion.

12. The display apparatus of claim 6, further comprising:
a first sensor disposed on the second-first base portion, wherein the first sensor comes into contact with the second bar when an upper end of the apron reaches a first position at a highest vertical level to sense a highest position of the second bar; and
a second sensor disposed on the second-first base portion further away from the apron than the first sensor, wherein the second sensor comes into contact with the second bar when the upper end of the apron reaches a second position at a lowest vertical level to sense a lowest position of the second bar.

13. The display apparatus of claim 12, further comprising:
a first stopper disposed on the second-first base portion, wherein the first stopper comes into contact with the second bar when the upper end of the apron reaches the first position at the highest vertical level to restrict a movement of the second bar; and
a second stopper disposed on the second-first base portion at a position further from the apron than the first stopper, wherein the second stopper comes into contact with the second bar when the upper end of the apron reaches the second position at the lowest vertical level to restrict the movement of the second bar.

14. The display apparatus of claim 13, wherein the first stopper and the second stopper are able to ascend and descend with respect to the second-first base portion.

15. The display apparatus of claim 6, further comprising a cover coupled to the first bar and moving together with the first bar,
wherein the cover covers at least a portion of a top face of the display apparatus when an upper end of the apron reaches a position at a lowest vertical level.

16. The display apparatus of claim 1, further comprising a guide bracket mounted on the housing and contacting a portion of at least one of the display and the apron to guide the movement of the apron.

17. A display apparatus comprising:
a display;
an apron coupled to the display;
a base;
a guide including:
a first end mounted on the apron;
a second end mounted on the base; and
a moving portion between the first and the second end and configured to move along a vertical axis;
a first motor coupled to the moving portion and configured to control a movement of the moving portion along the vertical axis; and
a moving supporter having a first end hingedly mounted on the apron and a second end mounted on the base and movable in a longitudinal axis of the base.

18. The display apparatus of claim 17, wherein a rotation shaft of the first motor is coupled to the moving portion, and
wherein rotation of the rotation shaft by the first motor causes the moving portion to move along the vertical axis.

19. The display apparatus of claim 17, wherein the moving supporter includes:
a link at the first end hingedly coupled to the apron;
a first bar having a first end pivotably coupled to the link; and
a second bar at the second end of the moving supporter connected to a second end of the first bar and movable on the base in the longitudinal axis of the base.

20. The display apparatus of claim 19, further comprising a second motor connected to the second bar and configured to move the second bar along the longitudinal axis of the base.

* * * * *